United States Patent
Clements

(10) Patent No.: US 9,500,303 B2
(45) Date of Patent: Nov. 22, 2016

(54) FLEXIBLE PIPE BODY AND METHOD OF PRODUCING SAME

(71) Applicant: Wellstream International Limited

(72) Inventor: Richard Alasdair Clements, Durham (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 214 days.

(21) Appl. No.: 14/369,166

(22) PCT Filed: Nov. 12, 2012

(86) PCT No.: PCT/GB2012/052809
§ 371 (c)(1),
(2) Date: Jun. 26, 2014

(87) PCT Pub. No.: WO2013/098548
PCT Pub. Date: Jul. 4, 2013

(65) Prior Publication Data
US 2015/0007903 A1    Jan. 8, 2015

(30) Foreign Application Priority Data

Dec. 30, 2011 (GB) .................................. 1122472.2

(51) Int. Cl.
*F16L 11/16* (2006.01)
*F16L 11/08* (2006.01)
*F16L 11/24* (2006.01)

(52) U.S. Cl.
CPC .............. *F16L 11/16* (2013.01); *F16L 11/083* (2013.01); *F16L 11/24* (2013.01); *Y10T 29/53* (2015.01)

(58) Field of Classification Search
CPC .................... F16L 11/082; F16L 11/083; F16L 11/16; F16L 11/24
(Continued)

(56) References Cited

U.S. PATENT DOCUMENTS 5,813,439 A * 9/1998 Herrero ................. F16L 11/082
138/130
6,065,501 A * 5/2000 Feret ..................... F16L 11/082
138/133

(Continued)

FOREIGN PATENT DOCUMENTS

AU        635292       3/1993
EP        1135623 A2   9/2001
(Continued)

OTHER PUBLICATIONS

International Preliminary Report on Patentability and Written Opinion of the International Searching Authority, mailed Jul. 10, 2014, for corresponding International Application No. PCT/GB2012/052809, 7 pages.

(Continued)

*Primary Examiner* — Patrick F Brinson
(74) *Attorney, Agent, or Firm* — Klarquist Sparkman, LLP

(57) ABSTRACT

A flexible pipe body and method of producing a flexible pipe body are disclosed. The flexible pipe body includes a layer comprising a first elongate tape element and a further elongate tape element, the first and further tape elements being alternately wound in a helical manner such that each first tape element winding lies between further tape element windings, the first tape element having a cross sectional profile including a central body extending from a radially inner edge to a radially outer edge and first and further side lobes extending from the central body outwards along the radially inner edge, the further tape element having a cross sectional profile including a central body extending from a radially inner edge to a radially outer edge and first and further side lobes extending from the central body outwards along the radially outer edge, wherein a first side wall portion of the central body of the further tape element is (Continued)

provided in continuous sliding contact with one of the first or further side lobes of the first tape element.

28 Claims, 4 Drawing Sheets

(58) Field of Classification Search
USPC .................................. 138/129, 134–136, 138
See application file for complete search history.

(56) References Cited

U.S. PATENT DOCUMENTS

| | | | |
|---|---|---|---|
| 6,253,793 | B1 | 7/2001 | Dupoiron et al. |
| 6,283,161 | B1* | 9/2001 | Feret ................... F16L 11/082 |
| | | | 138/133 |
| 6,378,193 | B1* | 4/2002 | du Chaffaut .......... B21C 37/121 |
| | | | 138/122 |
| 6,739,355 | B2 | 5/2004 | Glejboel et al. |
| 6,981,526 | B2* | 1/2006 | Glejbol .................. F16L 11/16 |
| | | | 138/129 |
| 8,561,648 | B2 | 10/2013 | Bectarte et al. |
| 2004/0154677 | A1* | 8/2004 | Coutarel ................. F16L 11/16 |
| | | | 138/135 |
| 2004/0221907 | A1* | 11/2004 | Glejbol .................. F16L 11/16 |
| | | | 138/129 |
| 2011/0030831 | A1* | 2/2011 | Clements .............. E21B 17/015 |
| | | | 138/109 |
| 2014/0000748 | A1* | 1/2014 | Gudme ................. F16L 11/082 |
| | | | 138/137 |
| 2014/0014218 | A1* | 1/2014 | Gudme ................. F16L 11/083 |
| | | | 138/137 |

FOREIGN PATENT DOCUMENTS

| | | |
|---|---|---|
| EP | 1141606 | 3/2004 |
| WO | 2008023110 A1 | 2/2008 |

OTHER PUBLICATIONS

International Search Report and Written Opinion of the International Searching Authority, mailed Jul. 18, 2013, for corresponding International Application No. PCT/GB2012/052809, 11 pages.

* cited by examiner

FLEXIBLE PIPE BODY AND METHOD OF PRODUCING SAME

CROSS REFERENCE TO RELATED APPLICATIONS

This is the U.S. National Stage of International Application No. PCT/GB2012/052809, filed Nov. 12, 2012, which in turn claims priority to and the benefit of U.K. Application No. GB 1122472.2, filed Dec. 30, 2011.

The present invention relates to a flexible pipe body, and a method of producing the same. In particular, but not exclusively, the present invention relates to a flexible pipe body having a pressure armour layer including a pair of helically wound tape elements with cooperating cross sectional profiles.

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers.

In many known flexible pipe designs the pipe body includes one or more pressure armour layers. The primary load on such layers is formed from radial forces. Pressure armour layers often have a specific cross section profile to interlock so as to be able to maintain and absorb radial forces resulting from outer or inner pressure on the pipe. The cross sectional profile of the wound wires which thus prevent the pipe from collapsing or bursting as a result of pressure are sometimes called pressure-resistant profiles. When pressure armour layers are formed from helically wound wired forming hoop components, the radial forces from outer or inner pressure on the pipe cause the hoop components to expand or contract, putting a tensile load on the wires.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. As a result the need for high levels of performance from the layers of the flexible pipe body is increased.

Flexible pipe may also be used for shallow water applications (for example less than around 500 meters depth) or even for shore (overland) applications.

One way to improve the load response and thus performance of armour layers is to manufacture the layers from thicker and stronger and thus more robust materials. For example for pressure armour layers in which the layers are often formed from wound wires with adjacent windings in the layer interlocking, manufacturing the wires from thicker material results in the strength increasing appropriately. However as more material is used the weight of the flexible pipe increases. Ultimately the weight of the flexible pipe can become a limiting factor in using flexible pipe. Additionally manufacturing flexible pipe using thicker and thicker material increases material costs appreciably, which is also a disadvantage.

EP1141606, U.S. Pat. No. 6,739,355, U.S. Pat. No. 6,283,161, U.S. Pat. No. 6,065,501, WO2008/023110, EP1135623 and EP1395769 disclose flexible pipe body having wound wires for the pressure armour layer, the wires having various cross-sectional profiles.

In addition, when using interlocked windings to form an armour layer, the windings generally have a certain degree of freedom to move with respect to adjacent windings, in the axial direction (i.e. along a coaxial plane). As the layer flexes in use, it has been known for the polymer material of an adjacent layer (such as the polymer barrier layer) to creep into the gaps between adjacent windings. This can lead to "lock up" of the windings where the crept polymer material fills the gap and the windings of the armour layer can no longer move in the axial direction and are prevented from bending. This will likely result in fatigue damage of the armour wires.

It is an aim of the present invention to at least partly mitigate the above-mentioned problems.

It is an aim of embodiments of the present invention to provide a flexible pipe body having improved resistance to pressures compared to known designs.

It is an aim of embodiments of the present invention to provide a flexible pipe body having a pressure armour layer that is less prone to 'lock up' of windings.

According to a first aspect of the present invention there is provided a flexible pipe body, comprising:
  a layer comprising a first elongate tape element and a further elongate tape element, the first and further tape elements being alternately wound in a helical manner such that each first tape element winding lies between further tape element windings,
  the first tape element having a cross sectional profile including a central body extending from a radially inner edge to a radially outer edge and first and further side lobes extending from the central body outwards along the radially inner edge,
  the further tape element having a cross sectional profile including a central body extending from a radially inner edge to a radially outer edge and first and further side lobes extending from the central body outwards along the radially outer edge,
  wherein a first side wall portion of the central body of the further tape element is provided in continuous sliding contact with one of the first or further side lobes of the first tape element.

According to a second aspect of the present invention there is provided a method of manufacturing a flexible pipe body, comprising:
  providing a layer comprising a first elongate tape element and a further elongate tape element, comprising alternately winding the first and further tape elements in a helical manner such that each first tape element winding lies between further tape element windings,
  the first tape element having a cross sectional profile including a central body extending from a radially inner edge to a radially outer edge and first and further side lobes extending from the central body outwards along the radially inner edge,
  the further tape element having a cross sectional profile including a central body extending from a radially inner edge to a radially outer edge and first and further side lobes extending from the central body outwards along the radially outer edge, wherein a first side wall portion of the central body of the further tape element is provided in continuous sliding contact with one of the first or further side lobes of the first tape element.

According to a third aspect of the present invention there is provided apparatus for forming a layer of a flexible pipe body, comprising:

a first elongate tape element and a further elongate tape element, the first and further tape elements suitable for being alternately wound in a helical manner such that each first tape element winding lies between further tape element windings, the first tape element having a cross sectional profile including a central body extending from a radially inner edge to a radially outer edge and first and further side lobes extending from the central body outwards along the radially inner edge, the further tape element having a cross sectional profile including a central body extending from a radially inner edge to a radially outer edge and first and further side lobes extending from the central body outwards along the radially outer edge, wherein a first side wall portion of the central body of the further tape element is provided in continuous sliding contact with one of the first or further side lobes of the first tape element.

Certain embodiments of the invention provide the advantage that the first and further tape element have profiles that are in sliding contact and work together to allow a predetermined degree of bending, yet provide little space or gaps for an adjacent layer to creep between the tape elements.

Certain embodiments of the invention provide the advantage that a pressure armour layer is provided that is less prone to lock up and fatigue damage than some known designs.

Certain embodiments of the invention provide the advantage that the profile of the tape elements can be formed to provide the wound layer with an improved pressure resistance over some known designs.

Embodiments of the invention are further described hereinafter with reference to the accompanying drawings, in which.

In the drawings like reference numerals refer to like parts.

Figure 1:
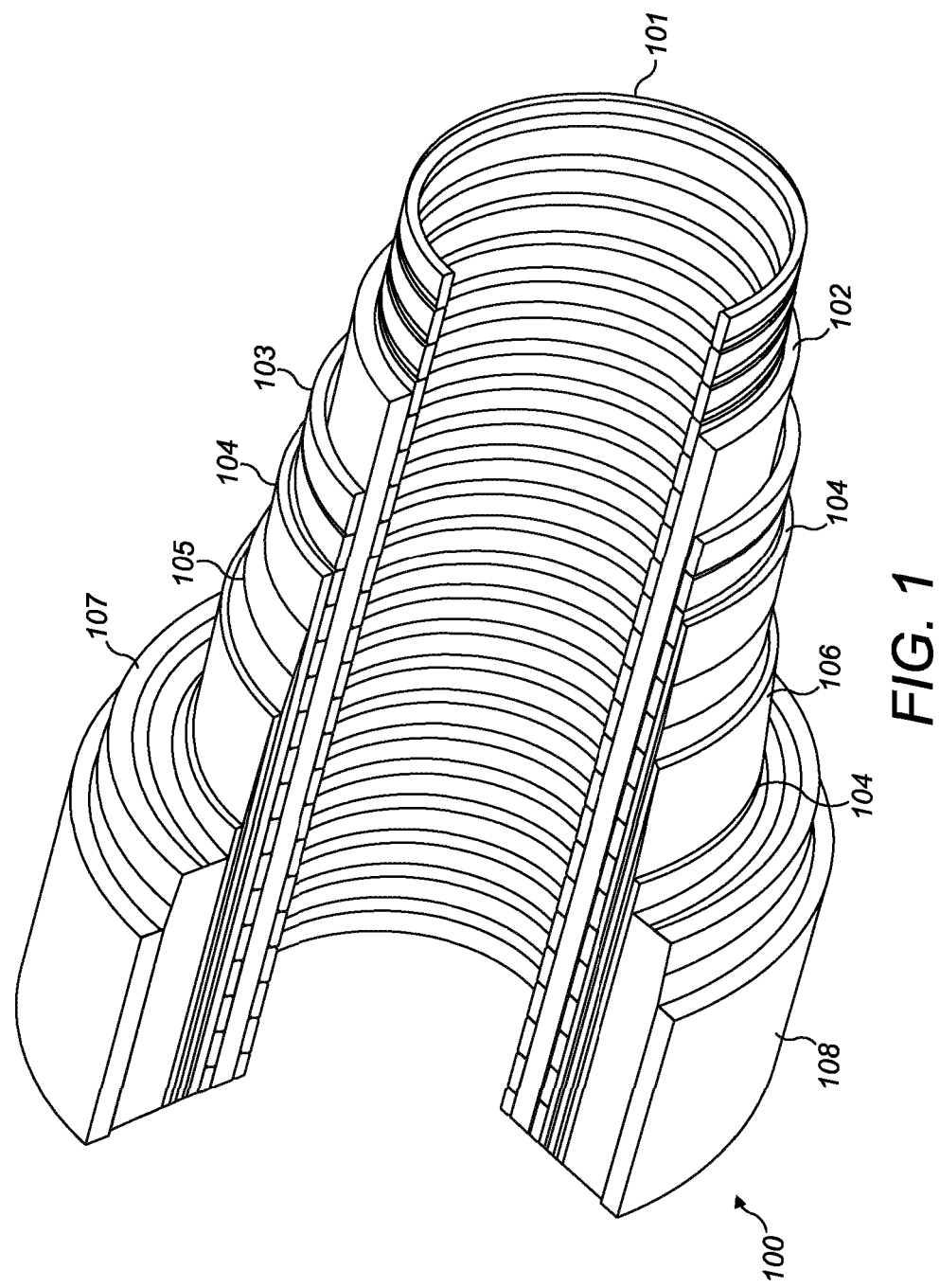
FIG. 1 illustrates a flexible pipe body.

Throughout this description, reference will be made to a flexible pipe. It will be understood that a flexible pipe is an assembly of a portion of a pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. It is to be further noted that the layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

A pressure armour layer 103 is a structural layer with a lay angle close to 90° that increases the resistance of the flexible pipe to internal and external pressure and mechanical crushing loads. The layer also structurally supports the internal pressure sheath, and typically consists of an interlocked construction.

The flexible pipe body also includes an optional first tensile armour layer 105 and optional second tensile armour layer 106. Each tensile armour layer is a structural layer with a lay angle typically between 10° and 55°. Each layer is used to sustain tensile loads and internal pressure. The tensile armour layers are often counter-wound in pairs.

The flexible pipe body shown also includes optional layers of tape 104 which help contain underlying layers and to some extent prevent abrasion between adjacent layers.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
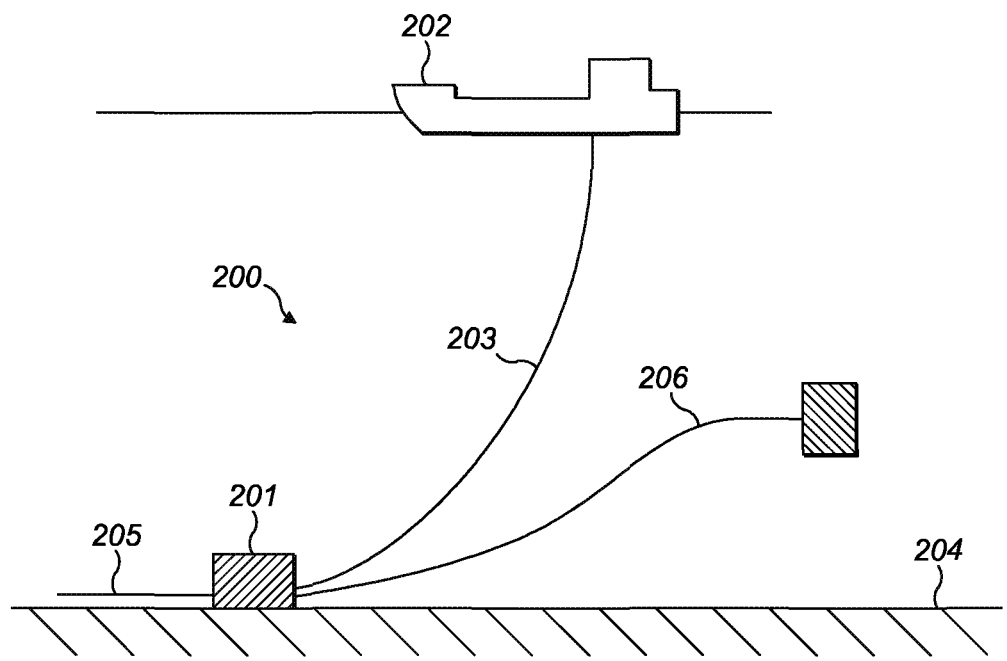
FIG. 2 illustrates a riser assembly.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

Figure 3:
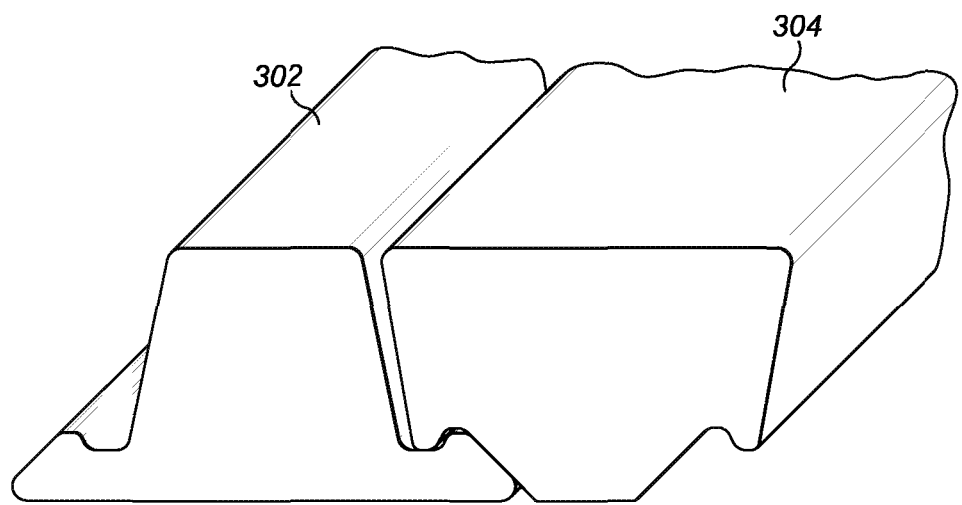
FIG. 3 illustrates a pair of tape elements.

FIG. 3 illustrates a pair of tape elements 302,304 according to an embodiment of the present invention. Each tape element is an elongate metal band, in this case of stainless steel. Tape elements 302,304 are preferably invariant in shape along their length. It will be appreciated that only a short portion of the elongate tapes are shown in FIG. 3 for conciseness.

The first elongate tape 302 and the second elongate tape 304 are alternatively wound in a helical manner such that the each winding of the first tape 302 lies between windings of the second tape 304. The helically wound tapes form a generally cylindrical layer that is suitable as a pressure armour layer.

Figure 4:
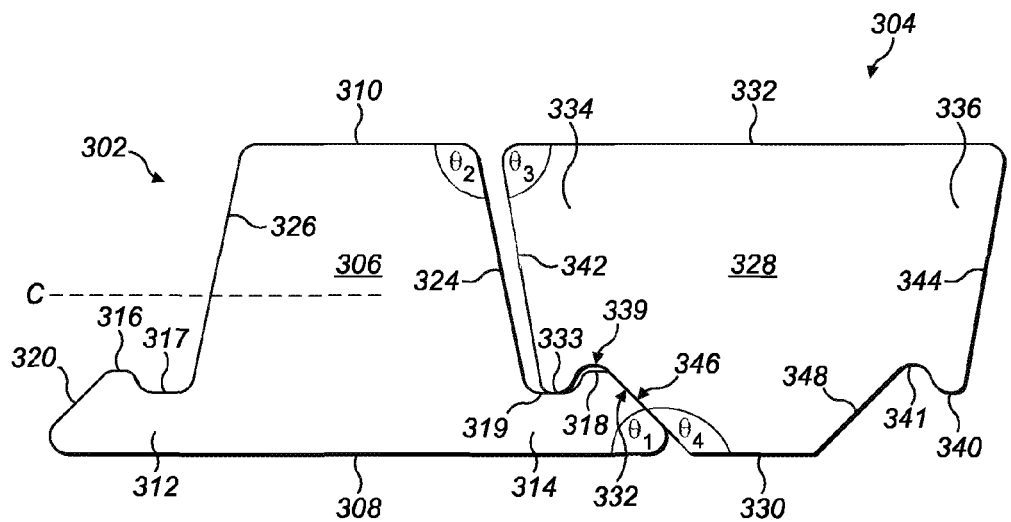
FIG. 4 illustrates the cross section profile of the tape elements of FIG. 3.

The cross sectional profile of the first and second tape 302,304 is shown in more detail in FIG. 4. Referring to those cross sectional profiles, the first tape 302 includes a central body region 306 extending from a radially inner edge 308 to a radially outer edge 310. The edge 308 is termed radially inner since it will be provided as the radially inner surface of the tape when the wound layer is formed. The edge 310 is termed radially outer since it will be provided as the radially outer surface of the tape when the wound layer is formed. The first tape 302 also includes a first side lobe 312 and second side lobe 314, which each extend outwards (sideways) from the central body region 306 along the radially inner edge 308. The first side lobe 312 includes a hooked portion 316 extending as an inwardly turned nose pointing towards the radially outer edge 310 (i.e. the nose is inwardly turned with respect to an imaginary centre line C). The second side lobe 314 includes a hooked portion 318 extending as an inwardly turned nose pointing towards the radially outer edge 310. The first side lobe 312 is shaped to have a surface 320 extending generally between the radially inner edge 308 and the hooked portion 316, which is at an oblique angle to the radially inner edge 308, i.e. at some diagonal, not at 90 degrees to the radially inner edge 308. Similarly (and as a mirror image to the first side lobe 308), the second side lobe 314 is shaped to have a surface 322 extending generally between the radially inner edge 308 and the hooked portion 318, which is at an oblique angle to the radially inner edge 308, i.e. at some diagonal, not at 90 degrees to the radially inner edge 308. Aptly the angle $\theta_1$ is between 15 and 45 degrees and in this case is 40 degrees. The mirror image angle between the radially inner edge 308 and the surface 320 is also 40 degrees. It is noted that the radially inner edge 308 blends smoothly into the surface 320, and the radially inner edge 308 also blends smoothly into the surface 322. The first side lobe 312 also includes a valley region 317 between the hooked region 316 and the central body portion 306. The second side lobe 314 also includes a valley region 319 between the hooked region 318 and the central body portion 306.

The central body region 306 includes a first side wall portion 324 extending between the radially outer edge 310 and the valley 319 of the second side lobe 314. The radially outer edge 310 blends smoothly into the first side wall portion 324. The central body region 306 includes a second side wall portion 326 extending between the radially outer edge 310 and the valley 317 of the first side lobe 312. The radially outer edge 310 blends smoothly into the second side wall portion 326. The first side wall portion 324 is at an oblique angle $\theta_2$ to the radially outer edge 310, i.e. at some diagonal, not at 90 degrees to the radially outer edge 310. Aptly the angle $\theta_2$ is between 92 and 105 degrees and in this case is 95 degrees. The mirror image angle between the radially outer edge 310 and the second side wall portion 326 is also 95 degrees.

The second tape 304 includes a central body region 328 extending from a radially inner edge 330 to a radially outer edge 332. The edge 330 is termed radially inner since it will be provided as the radially inner surface of the tape when the wound layer is formed. The edge 332 is termed radially outer since it will be provided as the radially outer surface of the tape when the wound layer is formed. The second tape 304 also includes a first side lobe 334 and second side lobe 336, which each extend outwards (sideways) from the central body region 328 along the radially outer edge 332. The first side lobe 334 includes a hooked portion 338 extending as a nose pointing towards the radially inner edge 330. The second side lobe 336 includes a hooked portion 340 extending as a nose pointing towards the radially inner edge 330. The first side lobe 334 is shaped to have a surface 342 extending generally between the radially outer edge 332 and the hooked portion 338, which is at an oblique angle $\theta_3$ to the radially outer edge 332, i.e. at some diagonal, not at 90 degrees to the radially outer edge 332. Similarly (and as a mirror image to the first side lobe 334), the second side lobe 336 is shaped to have a surface 344 extending generally between the radially outer edge 332 and the hooked portion 340, which is at an oblique angle to the radially outer edge 332, i.e. at some diagonal, not at 90 degrees to the radially outer edge 332. Aptly the angle $\theta_3$ is between 75 and 88 degrees and in this case is 85 degrees. The mirror image angle between the radially outer edge 332 and the surface 344 is also 85 degrees. It is noted that the radially outer edge 332 blends smoothly into the surface 342, and the radially outer edge 332 also blends smoothly into the surface 344. The first side lobe 334 also includes a valley region 339 between the hooked region 338 and the central body portion 328. The second side lobe 336 also includes a valley region 341 between the hooked region 340 and the central body portion 328.

The central body region 328 includes a first side wall portion 346 extending between the radially inner edge 330 and the valley 339 of the first side lobe 334. The central body region 328 includes a second side wall portion 348 extending between the radially inner edge 330 and the valley 341 of the second side lobe 336. The first side wall portion 346 is at an oblique angle $\theta_4$ to the radially inner edge 330, i.e. at some diagonal, not at 90 degrees to the radially inner edge 330. Aptly the angle $\theta_4$ is between 105 and 135 degrees and in this case is 140 degrees. The mirror image angle between the radially inner edge 330 and the second side wall portion 348 is also 140 degrees.

As can be seen in FIG. 4 with reference to centre line C, the first and second side lobes 312,314 of the first tape 302 extend less than 50% of the height of the tape 302, i.e. between the radially inner edge 308 and radially outer edge 310. Similarly, the first and second side lobes 334,336 of the second tape 304 extend greater than 50% of the height of the tape 304, i.e. between the radially inner edge 330 and radially outer edge 332. Aptly, the first and second side lobes 312,314 of the first tape 302 extend between 5 and 40% of the height of the tape 302, and in this case it is about 30%. Aptly, first and second side lobes 334,336 of the second tape 304 extend between 60 and 95% of the height of the tape 304, and in this case it is about 80%.

Figure 5:
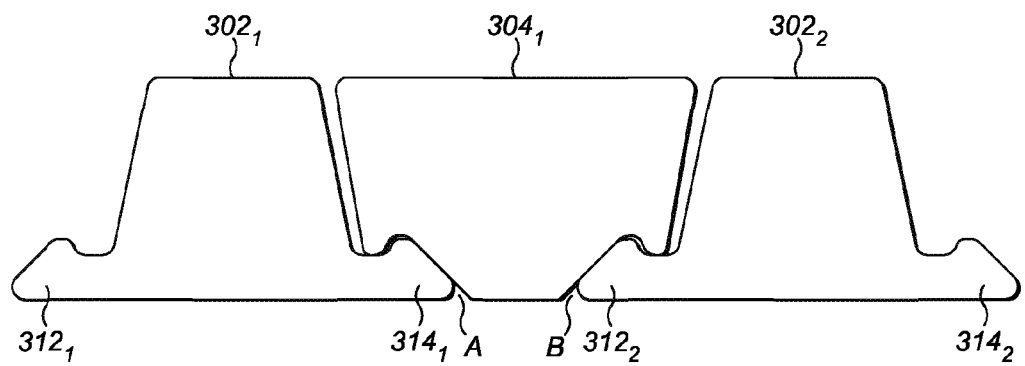
FIG. 5 illustrates wound tape elements.
Figure 6:
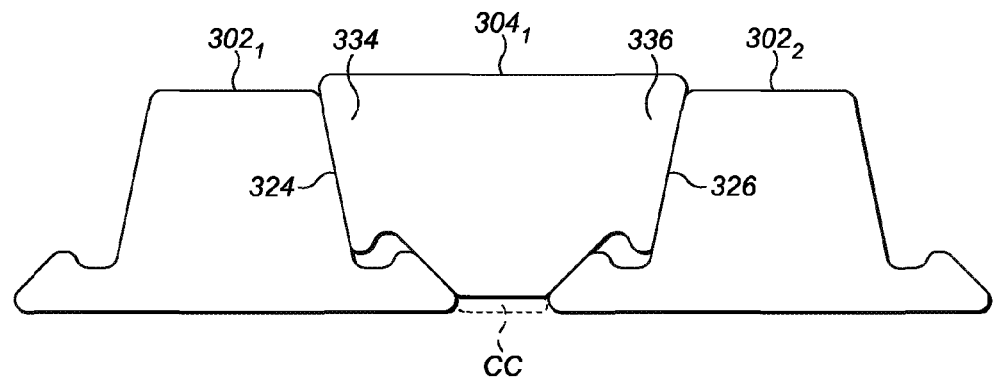
FIG. 6 illustrates the wound tape elements of FIG. 5 after pipe bending.

FIGS. 5 and 6 illustrate how tapes 302,304 that have been alternately wound are able to move with respect to each other upon bending of a flexible pipe. FIG. 5 illustrates the tape profiles in a 'normal' position, without any bending. FIG. 6 illustrates the tape profiles after bending.

As shown in FIG. 5, the second tape 304 will normally lie between windings of tape $302_{1,2}$ with its first and second side wall portions 346,348 in contact with respective side lobes $312_{1,2}$, $314_{1,2}$ of the first tape 302. More specifically, the side wall portions 346,348 contact the surfaces 320,322 of the side lobes 312,314.

As shown in FIG. 6, upon bending of the pipe, the second tape 304 slides simultaneously upwards and outwards, i.e. in both radial and axial directions, with the first side wall portion 346 and second side wall portion 348 continuously sliding against the side lobes $312_2$, $314_1$ of the first tape 302. As shown the windings of the first tape 302 will move closer together slightly upon bending.

However, after a certain amount of sliding contact, the side lobes 334,336 will respectively contact the first side wall portion 324 and second side wall portion 326 of the adjacent windings of the first tape 302. At this point, since the surfaces 324,326 are steeper than the surfaces 320,322 (i.e. at angles closer to perpendicular with the radially inner and outer edges), there is a higher degree of resistance to sliding due to friction. The movement of the second tape winding 304 is therefore curtailed (either slowed or stopped).

It will be noted that the layer formed by the tape windings will often be sandwiched between a radially inner layer, such as a polymer barrier layer, and a radially outer layer, such as a tensile armour layer. In this case the overlying tensile armour layer will also of course bend as this layer bends, and sufficient space will be available for the radially outwards movement of the windings of tape 304. However, after a certain amount of movement, the outer tensile armour layer will prevent any further radial movement of the windings of tape 304. Then, as the pipe reverts to its original position, the tensile armour layer will force the windings of tape 304 back into their original position (as per FIG. 5). All of the hooked portions 316,318,339,340 are engageable and will assist in preventing the windings from disengaging from adjacent windings at any time.

As indicated by the generally triangular areas A and B in FIG. 5, the wound tapes provide only a small space for an adjacent inner polymer barrier layer for example to creep into. Creep of the barrier layer is undesirable since the performance for retaining fluid in the pipe may be compromised.

As indicated by the area CC in dotted lines of FIG. 6, in a bent mode, an adjacent inner polymer barrier layer may be able to creep into the space CC over a relatively larger width. However, as the tape 304 moves back to its original position after bending, any polymer in area CC will be pushed by radial forces (acting over a wider area) back to its original position. Thus, pinching of polymer between windings, which is a known problem with some current designs, is avoided.

In a method according to an embodiment of the invention, first and second tapes, such as those shown in FIG. 3 are helically wound to form a cylindrical layer. A first side wall portion of the central body of the second tape element is provided in continuous sliding contact with one of the first or second side lobes of the first tape element. The winding may be mechanical or manual, in a manner known in the art.

The layer may be wound over a mandrel, or over an already formed layer of a flexible pipe body, such as an extruded polymer barrier layer. Further layers of flexible pipe body may then be added over the layer.

Figure 7:
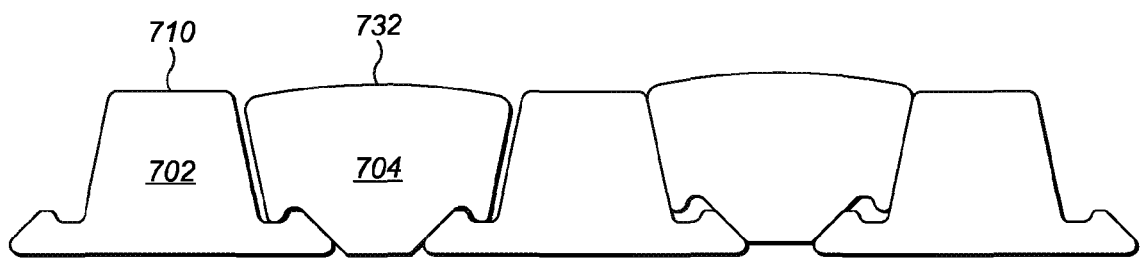
FIG. 7 illustrates tape elements according to another embodiment.

A further embodiment of the invention is illustrated in FIG. 7. The tape windings bear many similarities with those of FIGS. 3 to 6. However, a radially outer edge 732 of a second tape profile 704 is curved in a convex manner. The first tape 702 may have a radially outer edge 710 as described above with respect to FIG. 4. The curved surface 732 may help to stabilize any contact with a radially outer layer upon contact (thereby avoiding the tape winding being knocked out of position if the winding was not perfectly aligned as it moved outwards). It will be appreciated that other surfaces of the profiles, such as the opposing sliding contact surfaces may in some embodiments be curved, to help vary the forces or radial displacement of the tape elements.

Figure 8:
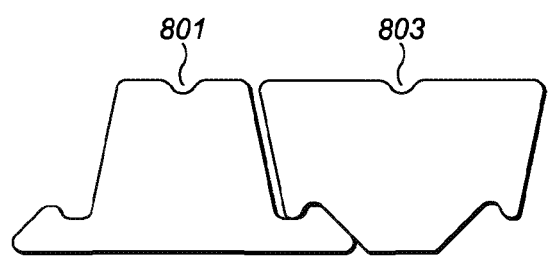
FIG. 8 illustrates tape elements according to yet another embodiment.

A yet further embodiment of the invention is shown in FIG. 8, in which the tape windings include a grooved region 801,803. The grooved region is useful for housing a monitoring or inspection system such as an optical fibre, or provide a pathway for the venting of unwanted gases.

With the present invention, the two wound tape elements work together to enable a certain, allowable degree of bending of the pipe layer. However, there is less space provided between adjacent tapes for a radially inner or radially outer layer to creep into. This, as well as the relative movement between windings, helps to ensure that lock up of the windings, and thus fatigue damage, is far less likely.

Furthermore, as one tape moves with respect to the other tape during bending, an adjacent polymer layer may be able to move into an area below one of the tapes, but is pushed back into its original position when the bend is reversed, without being pinched between tapes or otherwise stuck between adjacent tape windings.

With the present invention an armour layer is provided that can withstand higher pressures compared to some known designs. The cross section profile of the tapes have a higher second moment of inertia value than other known shapes, which increases the pressure capability without increasing the thickness of the layer. The flexible pipe therefore has improved burst resistant characteristics.

Since the side lobes of the profiles are offset from the centre line and closer to the radially inner portion of a flexible pipe body, i.e. the side lobes 312,314 extend less than 50% of the height of the tape 302, this helps to give the side lobes some degree of bendability (depending on their particular choice of material). This bendability is helpful in keeping the radially inner surface of the formed layer, which is often adjacent a polymer barrier layer, as a smooth, non-undulating surface.

In addition, as the central body of a second tape slides against a side lobe of a first tape, this provides some support for the side lobe. Furthermore, the load caused by the bending is transferred through the side lobe and into the central body of the second tape without any point loading, which can cause fretting and fatigue damage. Fretting is caused by a "stick-slip" mechanism causing failure, initiating at the material surface, as will be known to a person skilled in the art.

The specific angles of the central body regions and the surfaces of the side lobes can be tuned to give a particular response, by selecting appropriate angles of contact.

It is useful if the pair of tape elements have a substantially similar cross sectional area. This is because the manufacture and winding of the tapes can be improved.

Various modifications to the detailed designs as described above are possible. For example, although the above described tape elements are described as formed of stainless steel, other materials may be used that are suitable for the particular application. For example a polymer, composite material or other material such as hot or cold rolled steel, depending, for example, on the intended service conditions. The two tapes 302,304 may be formed from a common material or from different materials each selected to provide respective performance characteristics.

Although the formed layer described above has been described in terms of forming a pressure armour layer, it will be realised that the layer could alternatively be used as another collapse resistant layer.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Flexible pipe body, comprising:
   a layer comprising a first elongate tape element and a further elongate tape element, the first and further tape elements suitable for being alternately wound in a helical manner such that each first tape element winding lies between further tape element windings,
   the first tape element having a cross sectional profile including a central body extending from a radially inner edge to a radially outer edge and first and further side lobes extending from the central body outwards along the radially inner edge,
   the further tape element having a cross sectional profile including a central body extending from a radially inner edge to a radially outer edge and first and further side lobes extending from the central body outwards along the radially outer edge,
   wherein a first side wall portion of the central body of the further tape element is provided in continuous sliding contact with one of the first or further side lobes of the first tape element,
   wherein, upon bending of the pipe, the first side wall portion of the further tape element slides against one of the first or further side lobes of the first tape element, and
   wherein the first and further tape element are shaped such that the first side wall portion of the further tape element can slide along the at least one side lobe simultaneously along radial and axial directions.

2. Flexible pipe body as claimed in claim 1 wherein the first side wall portion of the further tape element is provided at an oblique angle to the radially inner edge of the further tape element.

3. Flexible pipe body as claimed in claim 2 wherein the side lobe of the first tape element in contact with the side wall portion of the further tape element is provided at an oblique angle to the radially inner edge of the first tape element complimentary to the oblique angle of the side wall portion of the further tape element.

4. Flexible pipe body as claimed in claim 1 wherein a further side wall portion of the central body of the further tape element is provided in continuous sliding contact with another one of the first or further side lobes of the first tape element.

5. Flexible pipe body as claimed in claim 2, wherein the first side wall portion of the further tape element is provided at an angle of between around 105 and 135 degrees from the radially inner edge of the further tape element.

6. Flexible pipe body as claimed in claim 5 wherein the side lobe of the first tape element in contact with the side wall portion of the further tape element is provided at an angle of between around 15 to 45 degrees from the radially inner edge of the first tape element.

7. Flexible pipe body as claimed in claim 1 wherein at least one of the first and further side lobes of the further tape element are provided at an angle of between around 75 to 88 degrees from the radially outer edge of the further tape element.

8. Flexible pipe body as claimed in claim 7 wherein a first side wall portion of the central body of the first tape element is provided at an oblique angle to the radially outer edge of the first tape element complimentary to the angle of the side lobe of the further tape element.

9. Flexible pipe body as claimed in claim 1 wherein the further tape element further comprises a first and further hooked portion respectively extending from each of the first and further side lobes.

10. Flexible pipe body as claimed in claim 9 wherein the first tape element further comprises a first and further hooked portion respectively extending from each of the first and further side lobes.

11. Flexible pipe body as claimed in claim 10 wherein each of the said hooked portions of the further tape element is shaped to be engageable with a respective one of the hooked portions of the first tape element.

12. Flexible pipe body as claimed in claim 1 wherein the first and further side lobes of the further tape element extend at least 50% of the distance between the radially outer edge and the radially inner edge of the further tape element.

13. Flexible pipe body as claimed in claim 12 wherein the first and further side lobes of the further tape element extend between 60% and 95% of the distance between the radially outer edge and the radially inner edge of the further tape element.

14. Flexible pipe body as claimed in claim 12 wherein the first and further side lobes of the first tape element extend 50% or less of the distance between the radially inner edge and the radially outer edge of the further tape element.

15. Flexible pipe body as claimed in claim 14 wherein the first and further side lobes of the first tape element extend between 5 and 40% of the distance between the radially inner edge and the radially outer edge of the further tape element.

16. Flexible pipe body as claimed in claim 1 wherein, upon bending of the pipe, the further tape element has the freedom to slide along one of the first or further side lobes of the first tape element, and then contacts the central body of the first tape element encountering a higher degree of resistance to sliding due to friction.

17. Flexible pipe body as claimed in claim 1 wherein the radially outer edge of the further tape element comprises a convex curve.

18. Flexible pipe body as claimed in claim 1 wherein a radially outer surface of first tape element and/or further tape element includes a grooved indent for containing a fibre element.

19. Flexible pipe body as claimed in claim 1 wherein the layer forms a pressure armour layer.

20. A method of manufacturing a flexible pipe body, comprising:
    providing a layer comprising a first elongate tape element and a further elongate tape element, comprising alternately winding the first and further tape elements in a helical manner such that each first tape element winding lies between further tape element windings,
    the first tape element having a cross sectional profile including a central body extending from a radially inner edge to a radially outer edge and first and further side lobes extending from the central body outwards along the radially inner edge,
    the further tape element having a cross sectional profile including a central body extending from a radially inner edge to a radially outer edge and first and further side lobes extending from the central body outwards along the radially outer edge,
    wherein a first side wall portion of the central body of the further tape element is provided in continuous contact with one of the first or further side lobes of the first tape element, and
    wherein, upon bending of the pipe, the first side wall portion of the further tape element slides against one of the first or further lobes of the first tape element, and
    wherein the first and further tape element are shaped such that the first side wall portion of the further tape element can slide along the at least one side lobe simultaneously along radial and axial directions.

21. A method as claimed in claim 20 wherein the first side wall portion of the further tape element is provided at an oblique angle to the radially inner edge of the further tape element, and the side lobe of the first tape element in contact with the side wall portion of the further tape element is provided at an oblique angle to the radially inner edge of the first tape element complimentary to the oblique angle of the side wall portion of the further tape element.

22. A method as claimed in claim 20 wherein a further side wall portion of the central body of the further tape element is provided in continuous sliding contact with another one of the first or further side lobes of the first tape element.

23. A method as claimed in claim 20 wherein a first side wall portion of the central body of the first tape element is provided at an oblique angle to the radially outer edge of the first tape element complimentary to an angle of the side lobe of the further tape element.

24. A method as claimed in claim 20, wherein the further tape element further comprises a first and further hooked portion respectively extending from each of the first and further side lobes,
    the first tape element further comprises a first and further hooked portion respectively extending from each of the first and further side lobes, and
    each of the said hooked portions of the further tape element is shaped to be engageable with a respective one of the hooked portions of the first tape element.

25. A method as claimed in claim 20, wherein the first and further side lobes of the further tape element extend at least 50% of the distance between the radially outer edge and the radially inner edge of the further tape element.

26. A method as claimed in claim 25 wherein the first and further side lobes of the first tape element extend 50% or less of the distance between the radially inner edge and the radially outer edge of the further tape element.

27. A method as claimed in claim 20 wherein, upon bending of the pipe, the further tape element has the freedom to slide along one of the first or further side lobes of the first tape element, and then contacts the central body of the first tape element encountering a higher degree of resistance to sliding due to friction.

28. Apparatus for forming a layer of a flexible pipe body, comprising:
    a first elongate tape element and a further elongate tape element, the first and further tape elements suitable for being alternately wound in a helical manner such that each first tape element winding lies between further tape element windings,
    the first tape element having a cross sectional profile including a central body extending from a radially inner edge to a radially outer edge and first and further side lobes extending from the central body outwards along the radially inner edge,
    the further tape element having a cross sectional profile including a central body extending from a radially inner edge to a radially outer edge and first and further side lobes extending from the central body outwards along the radially outer edge,
    wherein a first side wall portion of the central body of the further tape element is provided in continuous contact with one of the first or further side lobes of the first tape element, and wherein
    the first and further tape element are configured such that, when alternately wound in a helical manner, the first side wall portion of the further tape element is slidable against one of the first or further side lobes of the first tape element, and
    wherein the first and further tape element are shaped such that the first side wall portion of the further tape element can slide along the at least one side lobe simultaneously along radial and axial directions.

* * * * *